United States Patent Office 3,382,285
Patented May 7, 1968

3,382,285
LIQUID NONIONIC POLYOXYALKYLENE SURFACE-ACTIVE MATERIALS
Richard R. Egan, Edina, and Leon D. Smiens, Minneapolis, Minn., assignors to Ashland Oil & Refining Company, Ashland, Ky., a corporation of Kentucky
No Drawing. Continuation-in-part of application Ser. No. 414,455, Nov. 27, 1964. This application Nov. 8, 1965, Ser. No. 506,900
3 Claims. (Cl. 260—615)

This invention relates to liquid nonionic polyoxyalkylene surface-active materials. In another aspect, it relates to a process for the preparation of such materials by the condensation of fatty alcohols with alkylene oxides.

This application is a continuation-in-part of our co-pending application Ser. No. 414,455, filed Nov. 27, 1964, now abandoned.

Detergents are well known compositions which find wide use throughout industry and in the home in applications where it is desirable to reduce the surface tension of a liquid, so that it will become more miscible with other liquids or will easily wet the surfaces of solid materials. In order to meet the many demands placed upon these materials by reason of their varied applications and uses, detergents are made in many forms and have many different combinations of properties. For example, detergents may be solids or liquids; they may be anionic, cationic, or nonionic; they may range from hydrophobic to hydrophillic; and they may vary considerably in their resistance to degradation by bacterial attack. With respect to the present invention, three properties are of particular importance; namely (1) the product must be liquid, (2) the product must have a high detergency, and (3) the product must be substantially completely degradable by the action of bacteria in a short period of time. The novel detergent composition of this invention has these three properties as well as many others found in high quality detergents.

It is an object of this invention to provide a novel, liquid nonionic detergent composition. It is another object of this invention to provide a liquid, nonionic composition which is a powerful detergent and which is degraded quickly by bacterial action. It is still another object of this invention to provide a process for alkoxylating a higher fatty alcohol to prepare a liquid, nonionic, biodegradable detergent composition. Still other objects will appear from the more detailed description of this invention which follows.

The polyoxyalkylene material of this invention is a mixed condensation product having a polyoxyalkylene chain of randomly distributed oxyethylene and oxypropylene units, which chain is attached to the radical or nucleus resulting from the removal of the hydroxylic hydrogen of an aliphatic straight-chain monohydroxy primary alcohol having 12 to 20 carbon atoms per molecule, the total of oxyalkylene units in said chain being 12 to 20, preferably 14 to 16, and the ratio of oxyethylene units to oxypropylene units in said chain being 2 to 4.5, preferably 2 to 3.5.

It is well-recognized in the field of alkylene oxide chemistry that when one subjects a reactive hydrogen compound to oxyalkylation, what is actually produced is a polymer of alkylene oxide except for the terminal group. Furthermore, where the amount of the alkylene oxide employed is relatively large, one does not obtain a single molecular compound having a defined number of oxyalkylene radicals, but rather, one obtains a "mixture" of closely related homologues wherein the statistical average number of oxyalkylene groups equals the number of mols of the alkylene oxide employed and the individual members present in the mixture contain varying numbers of oxyalkylene groups. Where, as in this invention, different oxyalkylene groups are distributed randomly throughout the oxyalkylene chain, it is conventional to characterize the chain as a heteric oxyethylene-oxypropylene chain. Following the conventional manner of illustrating general formulas for polyoxyalkylenes, the mixed condensation products of this invention can be expressed as:

$$Y-O(R-O)_nH$$

wherein Y is the radical, residue, nucleus or hydrocarbon moiety of the aforementioned alcohol having 12 to 20 carbon atoms, RO is a heteric polyoxyalkylene chain of randomly distributed oxyethylene and oxypropylene units, the total of these oxyalkylene units in the chain being "n," which is an integer of 12 to 20, preferably 14 to 16, and the ratio of oxyethylene units to oxypropylene units in the chain being 2 to 4.5, preferably 2 to 3.5, which chain is attached to said hydrocarbon moiety through an etheric oxygen linkage, i.e., the polyoxyalkylene chain is attached to the residue of the alcohol at the site of its reactive hydrogen atom. Alternatively, the polyoxyalkylenes can be illustrated as mixtures of $Y-O(R-O)_nCH_2CH_2OH$ and $Y-O(R-O)_nCH_2CH(OH)CH_3$ (with the latter being present in minor amounts), where Y and RO are as defined above, and "n" is an integer of 11 to 19, preferably 13 to 15.

The polyoxyalkylene products of this invention are produced by a process in which a primary aliphatic monohydric alcohol having 12 to 20 carbon atoms per molecule is agitated and heated to a temperature of 225–400° F. while ethylene oxide and 1,2-propylene oxide are added slowly and simultaneously or as a mixture to the heated alcohol, preferably in the presence of alkaline catalysts such as the salts or the hydroxides of the alkali metals or the alkaline earth metals. When the alkylene oxides and alcohol are condensed in the proper proportion to one another, the resulting product is a liquid, nonionic, surface-active material which is a powerful detergent, and which is easily biodegradable, and can be used in unbuilt or built detergent formulations. Generally, the condensation products of this invention are clear liquids at a temperature in the range of 32 to 85° F. The preferred polyoxyalkylene products of this invention are clear liquids at room temperature (62 to 72° F.) and have excellent freeze-thaw resistance, the total oxyalkylene units in the heteric polyoxyalkylene chain being 14 to 16 and the ratio of oxyethylene units to oxypropylene units in said chain being 2 to 3.5, and typically 3. The preferred products made from unsaturated alcohols (e.g., Adol 42) have melting points below 60° F., and those made from saturated alcohols (e.g., Adol 63) have melting points below 70° F.

The precise chemical nature of the higher alcohol, as well as the proportionate amounts of the three reactants, are variables which can be employed to alter the properties of the final product. Whether or not the desired condensate is liquid depends on the ratio of ethylene oxide and propylene oxide condensed with the alcohol, the molecular weight of the alcohol, and the total number of alkylene oxide molecules condensed with the alcohol. If the reactants alcohol is to some extent unsaturated, a higher amount of alkylene oxide can be employed before the product changes from a liquid to a solid. Furthermore, as higher and higher proportions of ethylene oxide to propylene oxide are employed in the condensation, smaller and smaller amounts of total oxides cause the product to be solid rather than liquid. It should be apparent from these relationships that many factors must be considered if the product of this process is to be a liquid, nonionic, surface-active detergent.

The base material of the condensation product is a higher straight-chain aliphatic monohydric primary alcohol, preferably a fatty alcohol, having an average of 12 to 20 carbon atoms per molecule. Particularly useful commercially available alcohol products found useful in the preparation of the polyoxyalkylene products of this invention are Adol 42, Adol 63, and Conoco 1618-S, using per mole of alcohol 12–20 moles of a mixture of the alkylene oxides wherein the ratio of ethylene oxide to propylene oxide was 3/1. In the preferred aspect of this invention, the base material is a mixture of alcohols having 14 to 18 carbon atoms per molecule. We particularly prefer to use a mixture (Adol 63) of alcohols derived from tallow, such mixture having an average composition of about 5% by weight of $C_{14}$ alcohol, about 30% by weight of $C_{16}$ alcohol, and about 65% by weight of $C_{18}$ alcohol, because tallow is a natural product readily available in commerce and because the condensation products of this invention made from such mixture have superior detergency properties and the least amount of color and odor when compared to products made from other base alcohols. This mixture of tallow-derived alcohols can be hydrogenated or non-hydrogenated. Another base material which can be used is one prepared synthetically by the polymerization of ethylene, and having approximate composition, about 20% by weight of $C_{14}$ alcohol and about 40% by weight of each of $C_{16}$ and $C_{18}$ alcohols. The alcohols generally most applicable in this invention can be mixtures of $C_{14}$, $C_{16}$ and $C_{18}$ alcohols between these two specific compositions. These base materials from two different sources can be employed to produce similar condensation products by the process of this invention if there is an appropriate adjustment in the proportions of alkylene oxides employed in the process.

The foregoing alcohols are preferably natural alcohols, but it is not necessary that such be the case. The natural alcohols may be saturated or unsaturated or may be mixtures of saturated and unsaturated alcohols. Since the unsaturated alcohols result in a product of lower melting temperature, they may be preferred in certain applications. While it is possible to produce products of this invention by starting with a particular alcohol, it is preferable to employ a mixture of two or more alcohols, and the most desirable is to have a ternary mixture of the $C_{14}$, $C_{16}$ and $C_{18}$ alcohols.

The alkylene oxides employed in the process of this invention are ethylene oxide and 1,2-propylene oxide. It is necessary to use a combination of these two oxides in order to obtain the desired properties in the final product. If ethylene oxide is the only oxide condensed with the alcohol, the product is likely to be a water-soluble solid, and if propylene oxide is the only oxide condensed with the alcohol, the product is likely to be a water-insoluble liquid or solid. Since neither of these combinations of properties is desired in this invention, it is important to employ the aforementioned proportions of both oxides.

The total amount of alkylene oxdes employed in this invention is from about 12 to about 20 moles of ethylene oxide plus propylene oxide per mole of alcohol. Less or more than these amounts will produce a product which does not have the desired surface activity, and less than these amounts will cause the product to be solid rather than liquid. An intermediate preferred range is from about 14 to about 16 moles to total alkylene oxides per mole of alcohol.

Within the above concentrations of moles of total alkylene oxides per mole of alcohol, it is important, as has already been mentioned, to maintain certain concentration relationships between the ethylene oxide and the propylene oxide. This is because as the proportions of these two materials are varied, the final product changes from a water-insoluble liquid or solid to a water-soluble solid. In the broadest sense, the molar proportions of ethylene oxide to propylene oxide can vary from 2 to 4.5, depending on the composition and molecular weight of the reactant alcohol which is to be condensed with these oxides. If the alcohol has a higher proportion of $C_{14}$ materials, or if there is a certain amount of unsaturated alcohol in the reactant, the proportion of ethylene oxide to propylene oxide should be higher; and, if the alcohol has a higher proportion of $C_{18}$ materials, or has essentially no unsaturation, the proportion of ethylene oxide to propylene oxide should be lower. A preferred proportion for the natural and synthetic alcohols described above is from 2 to 3.5 moles of ethylene oxide per mole of propylene oxide. For many alcohol compositions, a proportion of 3 moles of ethylene oxide per mole of propylene oxide produces a very desirable product.

The process of this invention is accomplished by mixing the reactant materials and then heating to an elevated temperature on the reaction vessel, and, optionally, a small amount of pressure in the presence of catalysts which promote the condensation reaction. In the preferred mode of operation, the alcohol is placed in a vessel and is stirred and heated to a temperature in the range of about 225° F. to about 400° F. The ethylene oxide and propylene oxide are then added simultaneously to the alcohol at a rate which is slow enough to prevent a runaway reaction. It makes no difference whether the oxides are added as a single stream of mixed oxides, whether they are added from two separate streams, or whether they are added alternatively in small incremental amounts. It is important, however, that the two oxides be added substantially simultaneously; that is, all of one oxide should not be added before any of the other oxide is added. The addition of all of one oxide before any of the other results in a product having large blocks of each oxide rather than random units of both oxides. The properties of the block-type product and the random-type product are different. Only the random attachment of both oxides has been found to produce the product of this invention.

The pressure of the reaction vessel may be essentially atmospheric or it may be superatmospheric. Pressure is not a critical feature of this invention, and it may vary from about atmospheric to about 200 p.s.i.g. without any material effect upon the process or the product.

The reaction times experienced in this process vary inversely with the reaction temperatures; that is, at lower temperatures, the reaction times are longer, and at higher temperatures, the reaction times are shorter. Typical reaction times may vary from about ½ hour to 3 hours.

This process is catalyzed by certain ionic, alkaline catalysts, principally strong bases or salts thereof with weak acids. In addition, dilute solutions of the hydroxides may be employed, e.g., potassium hydroxide. The preferred catalysts used in the process of this invention are the sodium, potassium, and quaternary ammonium salts and hydroxides. The concentration of these catalysts in the reaction mixture is not critical and may vary from about 0.1% to 5% by weight of the alcohol reactant.

A particularly important property of the composition of this invention is the property of biodegradability. This property is the capability of degrading the composition of bacterial attack to a material which is not a detergent. This is becoming increasingly important because the waste streams from industrial plants are emptying detergents into streams thereby producing stable foams and suspending waste material in the stream which can adversely affect the plant and fish life in the stream. If the detergent is not easily biodegradable, the detergent will last for a long period of time, causing this adverse effect upon the streams. Almost every detergent is biodegradable to some extent, but the rate of biodegradation is the most important factor. The detergent of this invention is highly biodegradable, while detergents which are based on branched-chain alcohols require up to two weeks to become completely degraded, and some detergents, having aromatic nuclei, become quite stable to bacterial attack after a partial degradation has taken place.

The condensation products of this invention can be used in non-built detergents or they can be used in liquid, semi-liquid, paste and powder built detergent formulations. In non-built detergents, the condensation products can be used per se, as dilute aqueous solutions (e.g., 5 to 40 weight percent concentration), or can be mixed with 85 to 90 weight percent of a filler such as sodium sulfate. In built formulations, where the condensation products are mixed, for example, with conventional alkaline builders, these condensation products will generally amount to 5 to 20 weight percent of the formulation, but in order to obtain the full detergency and economic benefits which these condensation products offer, we prefer that the amount of our novel detergent product used be in the range of 8 to 15 weight percent of the formulation. In these built formulations, the conventional components such as foamers (e.g., sodium lauryl sulfate), foam stabilizers (e.g., fatty alkanol amides, fatty amine oxides), sequestering agents (e.g., sodium tripolyphosphate, sodium carbonate), corrosion inhibitors or anti-tarnish agents (e.g., sodium metasilicate), soil suspending agents (e.g., sodium carboxymethylcellulose), inert fillers (e.g., sodium sulfate), optical brighteners, and the like, can be used in their conventional amounts. The preparation of these built formulations is conventional in the art and will not be described in the interest of brevity. The built formulations of this invention are especially suitable as heavy duty clothes cleaning detergent products. Other formulations in which our novel condensation products can be used include light duty fine fabric detergents, dishwashing liquids and powders, dairy detergents, metal cleaners, paper machine felt cleaners, floor cleaners, automobile washing detergents, textile wetting liquids, steam cleaners, emulsion cleaners, cutting oils, aircraft cleaners, bottle washing cleaners, detergent sanitizers, and the like. Since our condensation products are nonionic, they can be readily formulated with other types of surface active agents, either nonionic, anionic, or cationic. Our condensation products have good alkali and acid stability and are soluble in a wide variety of polar and non-polar solvent, which makes these products readily adaptable in a wide variety of formulations, as indicated above. Where desired, they can be conventionally bleached, e.g., with hydrogen peroxide or sodium chlorite, to obtain colors of 1⁻ on the Gardner scale. In addition to their use as detergents or in detergent formulations, our condensation products also have utility as emulsifiers and wetting agents for various substrates such as wood, ceramic tile, asphalt tile, vinyl tile, metals, glass, and other substrates which can be cleansed.

A preferred polyoxyalkylene (Arosurf EO-105) of this invention was made by condensing a mixture (Adol 63) of alcohols derived from tallow with a mixture of 3 moles of ethylene oxide per mole of propylene oxide, using a total of 16 moles of alkylene oxide per mole of alcohol. Properties of this polyoxyalkylene are as follows:

| | |
|---|---|
| Appearance | Pale yellow liquid |
| Freezing point, °C | 16–17 |
| Cloud point (1% solution in $H_2O$), °C | 65 |
| pH (1% solution in $H_2O$) | 6.0–8.0 |
| Active ingredients, percent | 99 |
| Specific gravity, 25°/25° C | 1.000 |
| Weight, lbs./gal., 25° C | 8.37 |
| Surface tension, 25° C., 50% rel. humidity, dynes/cm. (ASTM D-1331-56): | |
|   0.01 wt. percent in $H_2O$ | 36.7 |
|   0.25 wt. percent in $H_2O$ | 36.0 |
|   0.05 wt. percent in $H_2O$ | 35.4 |
| Interfacial tension, 25° C., 50% rel. humidity, dynes/cm. (ASTM D-1331-56): | |
|   0.01 wt. percent in $H_2O$ | 8.6 |
|   0.025 wt. percent in $H_2O$ | 7.9 |
|   0.05 wt. percent in $H_2O$ | 7.3 |

| | Water hardness | | | | | |
|---|---|---|---|---|---|---|
| | Distilled | | 100 p.p.m. | | 300 p.p.m. | |
| | Initial | 5-min. | Initial | 5-min. | Initial | 5-min. |
| Ross Miles foam test, ml. of foam at 25° C. (ASTM D-1173-53): | | | | | | |
|   0.01 wt. percent in $H_2O$ | 33 | 28 | 40 | 33 | 32 | 22 |
|   0.025 wt. percent in $H_2O$ | 45 | 40 | 43 | 34 | 44 | 34 |
|   0.05 wt. percent in $H_2O$ | 54 | 45 | 36 | 30 | 49 | 41 |

| | |
|---|---|
| Biodegradability, percent degraded: | |
|   After 4 days | 92 |
|   After 8 days | 95 |

The polyoxyalkylene described was found to be relatively nontoxic and non-irritating to skin in its undiluted form, and was soluble in water, propylene glycol, benbene, butyl Cellosolve, isopropanol, acetone, methanol, toluene, and in kerosene (above 20%).

The following examples further illustrate the objects and advantages of this invention, but it should be understood that this invention is not to be unduly limited to the particular details set forth in these examples.

Example I

A series of runs was carried out in which products produced by condensing alcohols from various sources with different proportions of ethylene oxide and propylene oxide were produced and evaluated as unbuilt formulations. In each instance (except as indicated), the process for preparing the condensation products was substantially the same and proceeded as follows:

(1) The alcohol was charged into a vessel and 0.3% by weight of 85% potassium hydroxide based on the weight of the alcohol was placed into the vessel;

(2) The vessel was heated to 220° F. and sparged with nitrogen;

(3) The vessel was placed under a vacuum of 25–29 in. Hg, and held for ½ hour at 220° F.;

(4) The vacuum was broken with nitrogen, and the vessel was heated to 330° F.;

(5) The ethylene oxide and propylene oxide were introduced as a mixture into the vessel at a temperature of 330° F. (the condensation reaction was exothermic, causing the reaction temperature to increase); in some of the runs made for purposes of comparison, only ethylene oxide was so introduced into the vessel;

(6) The reaction was continued at a pressure of 35–40 p.s.i.g. and a temperature of 350° to 370° F.;

(7) After the addition of alkylene oxide material was completed, the pressure was reduced to atmospheric and the vessel was cooled to 200° F.;

(8) A sufficient amount of phosphoric acid was added to neutralize the potassium hydroxide and the contents were agitated for an additional half hour, following which the vessel was cooled to the desired temperature and the product was filtered.

The resulting condensation products were diluted with water (100 p.p.m. hardness) to provide 0.025 wt. percent working detergent solutions. The solutions were evaluated by using such in a standard wash and dry cycle on a standard soiled swatch of material, according to the general operating procedure described in the Terg-O-Tometer Instruction Manual of the U.S. Testing Co., Inc. The reflectance of the swatch before and after washing was measured. The percentage increase in reflectance is a measure of the efficiency of the detergent tested. Results of this evaluation are summarized in Table I which follows.

TABLE I

| Run [1] | Condensation product used | | | |
|---|---|---|---|---|
| | Alcohol | Mole ratio alcohol/ ethylene oxide/ propylene oxide | Physical state at 25° C. | Improvement in reflectance, percent |
| 1 | Hydrogenated tallow alcohol ($C_{12}$, 1%; $C_{14}$, 4%; $C_{16}$, 32%; $C_{18}$, 62%; $C_{20}$, 1%). | 1:12:4 | Liquid | 13.1 |
| 2 | $C_{16}$–$C_{18}$ synthetic saturated alcohols | 1:12:4 | do | 14.8 |
| 3 | Mixture of cetyl, stearyl and oleyl alcohols | 1:12:4 | do | 14.8 |
| 4 | $C_{12}$–$C_{18}$ synthetic saturated alcohols | 1:9.5:0 | Solid | 13.3 |
| 5 | Mixture of cetyl, stearyl and oleyl alcohols (25%, 18%, 41%). | 1:12:0 | do | 12.5 |
| 6 | Stearyl alcohol | 1:15:0 | do | 8.7 |
| 7 [2] | Mixture of $C_8$ to $C_{10}$ alcohols | ([3]) | Liquid | 4.5 |

[1] In Runs 1 to 3, the alcohol was condensed with a mixture of the alkylene oxides; in Runs 4 to 6, the alcohol was condensed with ethylene oxide only.
[2] The condensation product of this run was obtained from a commercial source.
[3] Unknown ratio but includes both oxides.

Table I shows that the liquid condensation products made in accordance with this invention (Runs 1, 2, 3) gave significant improvement in reflectance and, though some of the products of the other runs did give some improvement in reflectance, they have the disadvantage of being solids.

Example II

In another series of runs, condensation products of various alcohols with different proportions of alkylene oxides were evaluated in built formulations at a concentration of 0.2 weight percent in water (100 p.p.m. hardness). The built formulation used in each run had the following composition:

| | Wt. percent |
|---|---|
| Condensation product | 10 |
| Sodium tripolyphosphate | 50 |
| Sodium metasilicate | 10 |
| Sodium sulfate | 26.9 |
| Sodium carboxymethylcellulose (detergent grade) | 1 |
| Optical brightener (Tinpole RT37) | 0.1 |
| Sodium dodecylbenzenesulfonate (Ultrawet K) | 2 |

The improvement in reflectance for each of the various built formulations was determined according to the procedure of Example I and the results obtained are summarized in Table II.

TABLE II

| Run | Condensation product used | | |
|---|---|---|---|
| | Alcohol | Mole ratio alcohol/ ethylene oxide/ propylene oxide | Improvement in reflectance, percent |
| 1 | Hydrogenated tallow alcohols ($C_{12}$, 1%; $C_{14}$, 4%; $C_{16}$, 32%; $C_{18}$, 62% $C_{20}$, 1%). | 1:12:4 | 12.0 |
| 2 | $C_{11}$–$C_{15}$ secondary alcohols | 1:9:0 | 10.5 |
| 3 | $C_{12}$–$C_{18}$ synthetic saturated alcohols | 1:9.5:0 | 10.3 |
| 4 | $C_8$–$C_{10}$ alcohols | ([1]) | 11.0 |

[1] Unknown ratio but includes both oxides.

Table II shows that the built formulation containing the condensation product of this invention (Run 1) gave a greater improvement in reflectance than the other built formulations containing condensation products outside the scope of this invention.

The following examples further illustrate a number of different built formulations in which our condensation products can be used, such as the condensation product of Run 1 of Table I.

Example III.—Acid detergent sanitizer formulation

| | Wt. percent |
|---|---|
| Condensation product | 5 |
| Alkyldimethylbenzyl ammonium chloride (50%) | 20 |
| Phosphoric acid (85%) | 35 |
| Water | 40 |

Example IV.—Acid cleaner formulation

| | Wt. percent |
|---|---|
| Condensation product | 10 |
| Phosphoric acid (85%) | 35 |
| Water | 65 |

Example V.—All-purpose cleaner formulation

| | Wt. percent |
|---|---|
| Condensation product | 8 |
| Trisodium phosphate | 1.5 |
| Potassium hydroxide | 0.1 |
| Tetrapotassium pyrophosphate | 2.5 |
| Alkylarylsulfonate (Ultrawet 60K soft) | 3.33 |
| Alkanolamide (lauric diethanol amide) | 2 |
| Water | 82.57 |

Example VI.—Aluminum brightener formulation

| | Wt. percent |
|---|---|
| Condensation product | 2 |
| Butyl Cellosolve | 16 |
| Phosphoric acid (85%) | 47.2 |
| Water | 34.8 |

Example VII.—Emulsion cleaner formulation

| | Wt. percent |
|---|---|
| Condensation product | 8 |
| Water | 10 |
| Kerosene | 17 |
| Oleic acid | 7 |
| Monoethanol amine | 8 |
| Orthodichlorobenzene | 50 |

Example VIII.—Furniture polish formulation

| | Wt. percent |
|---|---|
| Condensation product | 4 |
| Mineral oil | 87 |
| Water | 9 |

Example IX.—Metal cleaner formulation

| | Wt. percent |
|---|---|
| Condensation product | 5 |
| Sodium hydroxide | 50 |
| Sodium metasilicate | 15 |
| Soda ash | 15 |
| Tetrasodium pyrophosphate | 15 |

Example X.—Steam cleaner formulation

| | Wt. percent |
|---|---|
| Condensation product | 5 |
| Sodium hydroxide | 30 |
| Borax | 30 |
| Soda ash | 20 |
| Trisodium phosphate | 15 |

Example XI.—Handcleaner formulation

| | Wt. percent |
|---|---|
| Condensation product | 9.7 |
| Deodorized kerosene | 48.6 |
| Oleic acid | 4.1 |
| Stearic acid | 2.8 |
| Sodium hydroxide | 0.4 |
| Water | 34.4 |

Example XII.—Dishwashing formulation

| | Wt. percent |
|---|---|
| Condensation product | 10 |
| Sodium alkylbenzene sulfonate (LAS type) | 25 |
| Fatty alkanol amide (lauric diethanol amide) | 5 |
| Water (plus perfume and dye) | 60 |

Example XIII

Another series of runs was carried out in which the same alcohol as that used in Run 1 of Example I was condensed in each run with different amounts and ratios of ethylene oxide and propylene oxide, using the same procedure as that employed in Example I except where indicated. This series of runs is summarized in Table III with a description of the properties of the polyoxyalkylene products obtained.

TABLE III

| Run | Mole ratio alcohol/ethylene oxide/propylene oxide | Properties of products c |
|---|---|---|
| 1 | 1:7:7 | Soft solid, very poor detergency. |
| 2 | 1:10:2 | Solid. |
| 3 | 1:8:3 | Soft solid, poor detergency. |
| 4 | 1:10.5:3.5 | Liquid, good detergency. |
| 5 a | 1:11:4 | Solid. |
| 6 b | 1:11:4 | Liquid, very poor water solubility. |
| 7 | 1:12:1 | Solid. | a In this run, the propylene oxide was first condensed with the alcohol, followed by oxyalkylation with the ethylene oxide.
b In this run, the ethylene oxide was first condensed with the alcohol, followed by oxyalkylation with the propylene oxide.
c The recited physical states for the products were determined at room temperature (25° C.).

The results shown in Table III establish that only the product of this invention (i.e., Run 4, where the alcohol was condensed with a mixture of the alkylene oxides wherein the ratio of ethylene oxide to propylene oxide was 10.5/3.5 or 3/1) was a liquid at room temperature.

Example XIV

Three runs were carried out using the procedure of Example I to prepare polyoxyalkylene products of this invention, wherein the alcohol of Run 1 of Example I was condensed with various mixtures of alkylene oxide. These runs are summarized in Table IV together with the properties of the products, all of which were clear liquids at a temperature in the range of 32 to 85° F.

TABLE IV

| Run | Mole ratio alcohol/ethylene oxide/propylene oxide | Freezing point of product, ° F. |
|---|---|---|
| 1 | 1:10.6:5.4 | 41 |
| 2 | 1:12.8:3.2 | 78.8 |
| 3 | 1:13:3 | 80.6 |

Various modifications and alterations of this invention will become apparent to those skilled in the art without departing from the scope and spirit of this invention, and it should be understood that the foregoing description and examples should not be construed to unduly limit this invention.

What is claimed is:

1. A liquid composition comprising a mixture of polyoxyalkylene compounds each having a heteric polyoxyalkylene chain of randomly distributed oxyethylene and oxypropylene groups attached to the residue of a straight-chain monohydroxy primary alcohol at the site of its reactive hydrogen atom, said chain having 12 to 20 oxyalkylene groups with the ratio of said oxyethylene to oxypropylene groups being 2 to 4.5, said alcohol having 12 to 20 carbon atoms per molecule and having a primary hydroxyl group as its only reactive substituent.

2. A liquid composition according to claim 1, wherein said chain has 14 to 16 oxyalkylene groups with the ratio of said oxyethylene to oxypropylene groups being 2 to 3.5.

3. A liquid composition according to claim 1, wherein said chain has 16 oxyalkylene groups, with the ratio of said oxyethylene to oxypropylene groups being 3, and wherein said alcohol is derived from tallow and is a mixture of fatty alcohols having 5–20% $C_{14}$ alcohol, 30–40% $C_{16}$ alcohol, and 40–65% $C_{18}$ alcohol.

References Cited

UNITED STATES PATENTS

| | | | |
|---|---|---|---|
| 2,425,755 | 8/1947 | Roberts et al. | 260—615 |
| 3,030,426 | 4/1962 | Moseley et al. | 260—615 |

FOREIGN PATENTS

| | | |
|---|---|---|
| 584,367 | 1/1947 | Great Britain. |

BERNARD HELFIN, *Acting Primary Examiner.*

LEON ZITVER, *Examiner.*

H. T. MARS, *Assistant Examiner.*

Notice of Adverse Decisions in Interferences

In Interference No. 96,880 involving Patent No. 3,382,285, R. R. Egan and L. D. Smiens, LIQUID NONIONIC POLYOXYALKYLENE SURFACE-ACTIVE MATERIALS, final judgment adverse to the patentees was rendered Mar. 7, 1972, as to claim 1.

[*Official Gazette May 22, 1973.*]

UNITED STATES PATENT OFFICE
CERTIFICATE OF CORRECTION

Patent No. 3,382,285  Dated May 7, 1968

Inventor(s) Richard R. Egan et al.

It is certified that error appears in the above-identified patent and that said Letters Patent are hereby corrected as shown below:

Column 2, line 61, "reactants" should read -- reactant --. Column 3, line 55, "oxdes" should read -- oxides --. Column 6, line 15, (in chart) "0.25" should read -- 0.025 --; lines 33 and 34, "benbene" should read -- benzene --.

Signed and sealed this 19th day of February 1974.

(SEAL)
Attest:

EDWARD M. FLETCHER, JR.  C. MARSHALL DANN
Attesting Officer  Commissioner of Patents